US010197380B2

(12) United States Patent
Rhoadarmer et al.

(10) Patent No.: US 10,197,380 B2
(45) Date of Patent: Feb. 5, 2019

(54) SYSTEM AND METHOD FOR A SELF-REFERENCING INTERFEROMETER

(71) Applicant: Leidos, Inc., Reston, VA (US)

(72) Inventors: Troy Rhoadarmer, Longmont, CO (US); Eric Berg, Thornton, CO (US)

(73) Assignee: Leidos, Inc., Reston, VA (US)

( * ) Notice: Subject to any disclaimer, the term of this patent is extended or adjusted under 35 U.S.C. 154(b) by 134 days.

(21) Appl. No.: 15/348,113

(22) Filed: Nov. 10, 2016

(65) Prior Publication Data

US 2017/0059301 A1    Mar. 2, 2017

Related U.S. Application Data

(60) Continuation of application No. 13/733,885, filed on Jan. 3, 2013, now Pat. No. 9,513,105, which is a division of application No. 12/839,520, filed on Jul. 20, 2010, now Pat. No. 8,462,349.

(51) Int. Cl.
*G01B 9/02* (2006.01)
*G01B 11/02* (2006.01)

(52) U.S. Cl.
CPC ..... *G01B 9/02097* (2013.01); *G01B 9/02081* (2013.01); *G01B 2290/70* (2013.01)

(58) Field of Classification Search
CPC .. G01B 9/02081; G01B 9/02; G01B 11/2441; G01B 11/161; G01B 2290/70; G01B 2290/45
USPC ................................................. 356/491–516
See application file for complete search history.

(56) References Cited

U.S. PATENT DOCUMENTS

| 5,317,382 | A | 5/1994 | Miyazaki et al. | 356/491 |
|---|---|---|---|---|
| 5,398,113 | A | 3/1995 | De Groot | 356/360 |
| 5,604,591 | A | 2/1997 | Edwards et al. | 606/198 |
| 6,727,992 | B2 | 4/2004 | Hill | 356/492 |
| 7,002,696 | B1 | 2/2006 | Miron | 356/519 |
| 7,437,077 | B2 * | 10/2008 | Wirth | G02B 26/06 250/201.9 |
| 7,457,545 | B2 * | 11/2008 | Wirth | H04B 10/1125 250/201.9 |
| 2003/0067657 | A1 * | 4/2003 | Dimmler | H04B 10/112 398/129 |

(Continued)

OTHER PUBLICATIONS

Troy A. Rhoadarmer, "Development of a Self-Referencing Interferometer Wave Front Sensor," Proceedings of SPE 5553, 112 (2004).

(Continued)

*Primary Examiner* — Sunghee Y Gray
(74) *Attorney, Agent, or Firm* — Dawn-Marie Bey; Bey & Cotropia PLLC

(57) ABSTRACT

Systems and methods are described herein for a self-referencing interferometer. The interferometer can comprise an improved spatial phase shifter that reduces the number of components, size and complexity of the spatial phase shifter and maintains a common path for a combined reference beam and signal beam. The self-referencing interferometer further comprises a single mode fiber shunt for filtering the reference beam and further reducing the size of the interferometer. The angle of the reference beam can be tilted before being recombined with the single beam which further simplifies the spatial phase shifting component of the interferometer.

9 Claims, 9 Drawing Sheets

(56) References Cited

U.S. PATENT DOCUMENTS

| | | | |
|---|---|---|---|
| 2005/0068540 A1 | 3/2005 | De Groot et al. | 356/512 |
| 2006/0024061 A1* | 2/2006 | Wirth | H04B 10/1125 398/129 |
| 2007/0195329 A1 | 8/2007 | Guthals et al. | 356/457 |
| 2007/0252951 A1* | 11/2007 | Hammer | A61F 9/008 351/221 |
| 2008/0265130 A1 | 10/2008 | Colomb et al. | 250/201.9 |
| 2010/0014090 A1 | 1/2010 | Wax et al. | 356/456 |

OTHER PUBLICATIONS

Troy A. Rhoadarmer and Laura M. Klein, "Design of a Spatially Phase Shifted Self-Referencing Interferometer Wave Front Sensor," Proceedings of SPIE 6306, 63060K (2006).

James A. Georges, III, "Optical Spatial Heterodyne Interferometric Fourier Transform Technique (OSHIFT) and a Resulting Interferometer," Proceedings of SPIE 6711, 671104 (2007).

* cited by examiner

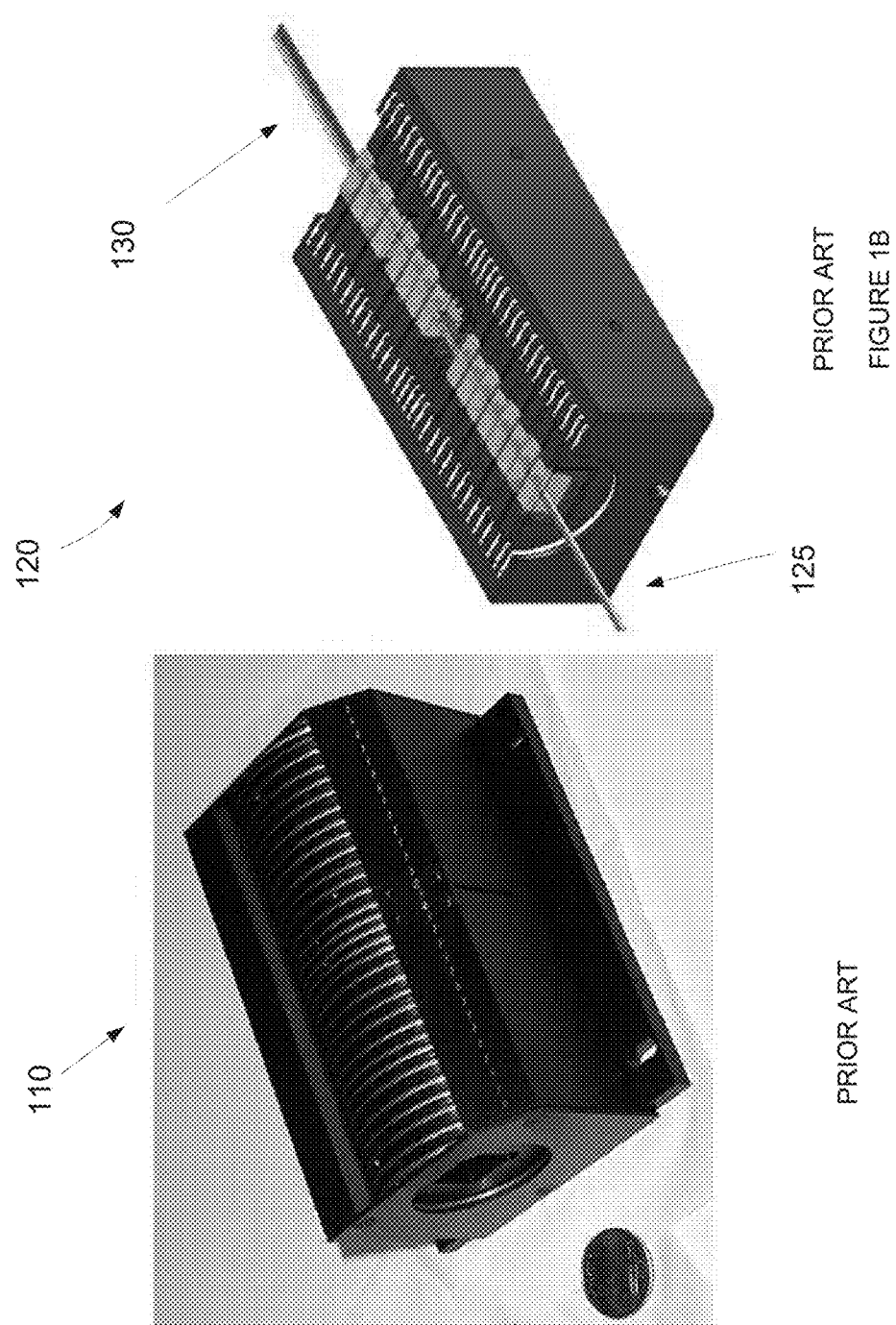

SYSTEM AND METHOD FOR A SELF-REFERENCING INTERFEROMETER

CROSS-REFERENCE TO RELATED APPLICATIONS

This application is a continuation of U.S. patent application Ser. No. 13/733,885, filed Jan. 3, 2013, entitled "SYSTEM AND METHOD FOR A SELF-REFERENCING INTERFEROMETER," which is a division of U.S. patent application Ser. No. 12/839,520, filed Jul. 20, 2010, entitled "SYSTEM AND METHOD FOR A SELF-REFERENCING INTERFEROMTER," now U.S. Pat. No. 8,462,349, both of which are incorporated herein by reference in their entirety.

FIELD OF THE INVENTION

The present invention relates generally to the field of interferometers and more particularly to a self-referencing interferometer that uses spatial phase shifting to reconstruct optical wave fronts.

DESCRIPTION OF THE RELATED ARt

Phase shifting interferometers used in directed energy or laser communications applications typically consist of a light source that is split into two beams—a reference beam and a signal beam. The two light beams travel different paths, the reference beam is spatially filtered, and then the beams are recombined in such a way that the wave front of the signal beam can be determined. Phase shifting interferometry can be used to accurately determine the phase differences between the two beams. By spatially filtering the reference beam to create a clean spherical wave front, the shape of the wave front of the signal beam can be determined. The recombined beams produce an optical interference pattern for each of the phase shifts between the reference beam and the signal beam. Prior art interferometers typically use a combination of prisms and wave plates to split optical beams and recombine the beams with different relative phase shifts. The limitations with prior art interferometers are that they can be large in size and can weigh several pounds or more, limiting their implementation. There are a number of technical limitations with prior art interferometers as well.

For example, existing interferometers must be designed to address non-common path aberrations. When a signal beam and a reference beam do not travel the same path within the interferometer, the two beams may be subject to aberrations that are not common to the paths of each beam. Since the interferometer measures the phase differences between the two beams, non-common path aberrations distort the desired measurement. Designing an interferometer to correct for these aberrations adds to the complexity of the interferometer.

As another example, it is not unusual for an interferometer to include numerous wave plates and prisms, each of which typically comprises two optical surfaces. Even with high quality components, as the number of optical surfaces increases, the optical throughput of the interferometer decreases and any non-common path aberrations increase. For example, FIGS. 1A and 1B illustrate a prior art spatial phase shifting assembly for use with an interferometer. FIG. 1A shows a prototype spatial phase shifting assembly 110 and FIG. 1B shows an isometric cross-sectional view of the same spatial phase shifting assembly 120. FIG. 1B shows two separate input light beams 125, comprising a reference beam and a signal beam, entering the spatial phase shifting assembly. The reference beam and signal beam pass through a series of prisms and wave plates that split the beams and combine them into four separate beam pairs, each pair with a different relative phase shift between the reference beam and the signal beam. FIG. 1B shows the four beam pairs 130, each pair comprising a reference beam and a signal beam, exiting the spatial phase shifting assembly 120. A conventional spatial phase shifting assembly, such as the one shown in FIGS. 1A and 1B can comprise 30 or more prisms and wave plates totaling 60 or more optical surfaces. The numerous optical surfaces limit the optical throughput of the spatial phase shifting assembly and worsen the problem of non-common path aberrations. Furthermore, having numerous custom optical elements and a custom mounting assembly in a conventional spatial phase shifting assembly greatly increases the cost of the assembly.

The weight and size of conventional spatial phase shifting assemblies also limits prior art interferometers. For example, the spatial phase shifting assembly shown in FIGS. 1A and 1B typically weights approximately three pounds and is five inches in length. The length of the spatial phase shifting assembly affects the focal lengths of the lenses used in the optical relays of the wave front sensor component in an interferometer. Accordingly, the weight and size of conventional spatial phase shifting assemblies limits how interferometers can be implemented and in which applications they can be used.

Another limitation in conventional interferometers is the length of the single mode fiber through which the reference beam passes. Conventional interferometers typically use a single mode reference fiber to spatially filter the reference beam. In a typical interferometer, the reference fiber is approximately eight inches in length. However, optical path matching is required to maintain coherence between the signal beam and the reference beam and ensure measurable contrast in the interference images. Due to the refractive index of the reference fiber, the length of the reference fiber requires approximately twelve inches of matching optical path and associated optical elements to be added to the signal path. The additional elements increase the weight and size of the interferometer.

Finally, the polarization requirements of a conventional interferometer using a spatial phase shifting assembly such as the one illustrated in FIGS. 1A and 1B further limit implementation of conventional interferometers for directed energy and laser communications applications. For example, the spatial phase shifting assembly in FIGS. 1A and 1B uses polarization to create the four beam pairs which produce the four interference images. The wave front sensor that measures the interference images requires fixed polarizations for the signal beam and reference beam at its input aperture. Furthermore, the length of the reference fiber creates a greater probability that mechanical and thermal disturbances can alter the polarization of the reference beam and reduce the measurement accuracy of the interferometer.

SUMMARY OF THE INVENTION

Summary of the Problem

There is a need for an improved spatial phase shifting interferometer that can be more easily used in directed energy and laser communications applications. In other words, a need exists for a smaller and less complex interferometer for directed energy and laser communications applications. Furthermore, an improved spatial phase shifting interferometer can have other applications, such as use in various types of optical testing.

Summary of the Solution

The embodiments of the present invention provide for an improved interferometer. The embodiments of the present invention improve upon prior art interferometers by reducing the size and complexity of the components of the interferometer.

In a first exemplary embodiment, the interferometer comprises an improved spatial phase shifting assembly. The improved spatial phase shifting assembly comprises a first interface that divides a signal beam into two components and divides a reference beam into two components. The first interface combines a first component of the signal beam with a first component of the reference beam producing a first beam pair and combines a second component of the signal beam with a second component of the reference beam producing a second beam pair. The first beam pair exits the first interface and passes through a half wave plate. The second beam pair exits the first interface and passes through a half wave plate, a quarter wave plate, and an optical component to adjust the alignment and conjugate image location of the beam path. A second interface divides the first and second beam pairs again so that four beam pairs exit the second interface. Each of the four beam pairs comprises a combination of a signal beam component and a reference beam component. Two of the four beam pairs pass through an optical component to adjust the alignment and conjugate image location of the beam path. The reference beam component and signal beam component of each pair combine to produce an interference pattern. The interference pattern is detected when each beam pair reaches a wave front sensor camera. Each of the four beam pairs also has a different, known relative phase shift between the signal component and the reference component. The wave front sensor processor uses the interference patterns created by the phase differences for each of the four beam pairs to identify any aberrations in the signal beam. The identified aberrations can be used in an adaptive optics system to control a spatial light modulator to correct the aberrations in the signal beam and improve beam quality.

In a second exemplary embodiment, a self-referencing interferometer uses an improved method to process an input signal. The method comprises receiving the input beam at the interferometer and splitting the input beam into a signal beam and a reference beam. The reference beam is transmitted through a single mode fiber shunt to remove aberrations in the reference beam. The reference beam and the signal beam are recombined by an optical component so that there is a defined relative tilt between the signal beam and reference beam. The recombined signal beam and reference beam are transmitted through an anamorphic optical relay, such as a crossed cylindrical lens relay, and to a wave front sensor camera. The wave front sensor processor analyzes the interference pattern produced by the recombined signal beam and reference beam in order to identify any aberrations in the signal beam. Identified aberrations can be used in an adaptive optics system to control a spatial light modulator to correct the aberrations in the signal beam and improve beam quality.

In a third exemplary embodiment, an improved self-referencing interferometer can identify and correct aberrations in a signal beam. The interferometer comprises a telescope for receiving an input beam. The beam is optically relayed to a fast steering mirror which aligns the beam with the optical axis of the system. The beam is optically relayed to a deformable mirror, or other spatial light modulator device, which is used to correct the phase aberrations in the input beam after they are identified by the wave front sensor. The beam is optically relayed to the input of the wave front sensor where a beam splitter divides the input beam into a signal beam and a reference beam. The reference beam is transmitted through and spatially filtered by a single mode fiber shunt. A combining prism receives the signal beam and the filtered reference beam and combines the two beams so that the two beams are at a specified angle relative to each other. An anamorphic optical relay, such as a crossed cylindrical lens relay, distorts the recombined signal beam and reference beam along an axis that is parallel to the axis in which the signal beam and the reference beam lie before they are combined. A lens images the recombined signal beam and reference beam on a wave front sensor camera. The wave front sensor processor comprises software executing on a computing device that can analyze the interference pattern produced by the recombined signal beam and reference beam and identify aberrations in the signal beam. Once identified, the software can correct the aberrations in the signal beam by adjusting the shape of the surface of the deformable mirror.

These and other embodiments are described in the detailed description that follows and the associated drawings.

BRIEF DESCRIPTION OF THE FIGURES

FIGS. 1A and 1B illustrate a prior art spatial phase shifting assemblies for use in an interferometer.

DETAILED DESCRIPTION OF THE EXEMPLARY EMBODIMENTS

The invention is directed to components and methods for improved interferometers. Although the exemplary embodiments of the improved interferometers will be described in the following text and the associated figures, those skilled in the art will recognize that the exemplary embodiments can be modified in various ways within the scope of the invention. For example, the exemplary embodiments described herein include certain conventional components such as lenses and mirrors. Those of skill in the art will recognize that various different types of lenses and mirrors can be substituted for the conventional components described herein. Those of skill in the art also will recognize that the configuration of the conventional lenses and mirrors described herein can be modified within the scope of the invention.

Figure 2A:
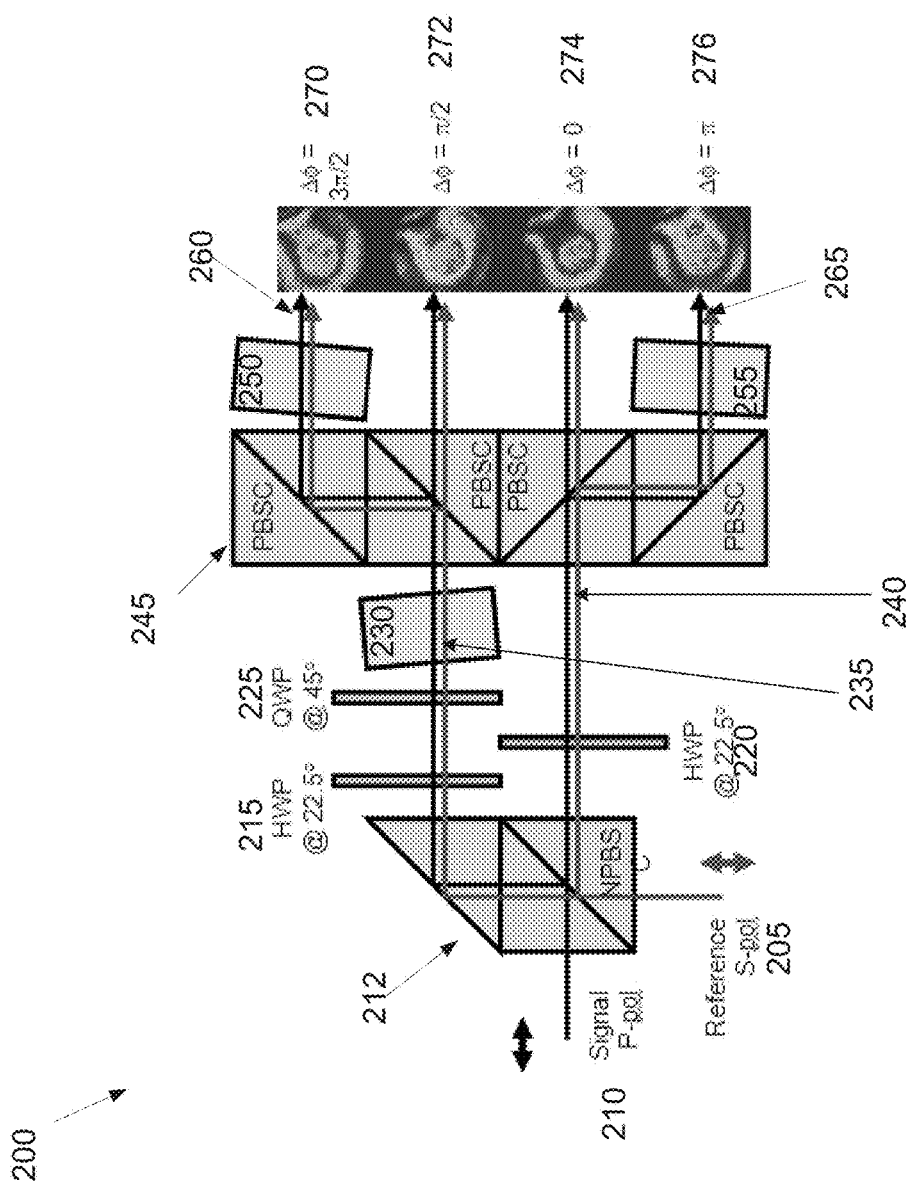
FIGS. 2A and 2B illustrate spatial phase shifters for use in an interferometer in accordance with an exemplary embodiment of the invention.

Turning to FIG. 2A, an exemplary embodiment of a miniature spatial phase shifter 200 is illustrated. The miniature spatial phase shifter 200 improves upon several of the limitations identified with prior art interferometers identified above. For example, the miniature spatial phase shifter 200 reduces non-common path aberrations in that the signal beam and the reference beam travel almost identical paths. The miniature spatial phase shifter 200 also reduces the number of optical components as compared to prior art interferometers. Reducing the number of required optical components has several benefits including smaller size, weight and cost for the device and improved optical throughput.

The miniature spatial phase shifter 200 receives a signal beam 210 and a reference beam 205 as both beams enter beam splitter component 212. Typically, at least the reference beam 205 is collimated when it enters the beam splitter component 212. The signal beam 205 may not be collimated due to aberrations in the beam. Beam splitter component 212 comprises a 50:50 non-polarizing cube beam splitter and a right angle prism with a reflective coating on its hypotenuse, both of which are commercially available devices. In alternate embodiments of the invention, the beam splitter component 212 could be replaced with a plate beam splitter and a mirror. In the embodiment illustrated in FIG. 2A, the reference beam 205 is linearly polarized in the vertical direction (s-polarization) and the signal beam is linearly polarized in the horizontal direction (p-polarization) so that the polarizations of the beams are orthogonal. The reference beam 205 enters the beam splitter from the bottom of the beam splitter and is split into two components. Similarly, the signal beam 210 enters the beam splitter from the left-hand side and is split into two components. In alternate embodiments of the invention using a non-polarizing beam splitter, the two beams can be recombined before entering the beam splitter and enter the beam splitter at the same face. The beam splitter component 212 combines the components of the signal beam 210 with the components of the reference beam 205 to produce combined beams 235 and 240. Once the components of the reference beam 205 and the signal beam 210 are combined into combined beams 235 and 240, each beam pair will travel the same path, thus reducing the problems associated with non-common path aberrations which cause unwanted differences between the signal beam and the reference beam. In the exemplary embodiment illustrated in FIG. 2A, the beam splitter 212 is a non-polarizing beam splitter made from commercially available components. Those of skill in the art will recognize that component 212 can be replaced with a polarizing beam splitter and the input polarizations can be rotated appropriately to produce a 50:50 beam split. Also, the orientation of the input polarizations can be different as long as they are orthogonal, although if the polarizations are non-linear, additional components would be required. Further, the input directions of the signal beam and reference beam can be altered. For instance, the two beams can enter the beam splitter at the same face.

Combined beams 235 and 240 pass through half wave plates 215 and 220 which rotate the polarization of the combined beam pairs 235 and 240 so that the signal beam components of the combined beam pairs are at +45° relative to the horizontal axis and the reference beam components of the combined beam pairs are at −45° relative to the horizontal axis. In alternate embodiments of the invention, half wave plates 215 and 220 can be replaced by a single half wave plate which spans both beam pairs 235 and 240 or by other types of wave plates which rotate the polarization of the combined beams 235 and 240 to the same end state. In the embodiment shown in FIG. 2A, combined beam 235 also passes through quarter wave plate 225 which has its fast axis aligned with the polarization of either the signal beam component of combined beam 235 or the reference beam components (+45° or −45° relative to the horizontal axis, respectively) in order to provide an additional relative quarter wave phase shift ($\lambda/4$ or $\pi/2$ radians, where $\lambda$ is the wavelength of the input beam) between the wave fronts of the signal beam component and the reference beam component within the combined beam pair. Combined beam 235 can also pass through pupil pusher 230. The pupil pusher 230 is a plane parallel window or similar optical component that can be tipped and tilted to transversely align the combined beam 235 with combined beam 240 at the wave front sensor camera and whose optical thickness is set to adjust the conjugate plane imaging of combined beam 235 to match the same conjugate image plane location as combined beam 240. In alternate embodiments of the invention, the quarter wave plate can be placed in the path of either combined beam 235 or combined beam 240. Also, the ordering of the half wave plate, quarter wave plate, and pupil pusher in the path of combined beam 235 in FIG. 2A is arbitrary such that these components can be in any order.

Combined beams 235 and 240 then pass through a second beam splitter component 245. The second beam splitter component 245 comprises four polarizing cube beam splitter components that are capable of splitting and reflecting beams of light. The beam splitter components that comprise beam splitter component 245 are commercially available devices. In the embodiment illustrated in FIG. 2A, beam splitter component 245 is a polarizing material that separates the horizontal and vertical polarization components of combined beams 235 and 240. In alternate embodiments of the invention, beam splitter component 245 could be implemented using polarizing beam splitting plates. Beam splitter component 245 further divides the polarization components of combined beams 235 and 240 producing additional combined beams 260 and 265. With proper orientation of the polarizations of combined beams 235 and 240 at the input to beam splitter component 245, as described above, beam splitter component 245 separates the reference beam component and signal beam component of combined beams 235 and 240 into equal power beams with orthogonal polarizations so that all four output combined beams 235, 240, 260, and 265 nominally have equal power. The polarization splitting of the combined beams 235 and 240 produces an additional relative half wave phase shift ($\lambda/2$ or $\pi$ radians) between the wave fronts of the signal beam component and the reference beam component within both of the transmitted combined beam pairs 235 and 240. In contrast, no additional relative phase shift is produced in the transmitted combined beam pairs 260 and 265.

Combined beam pairs 235, 240, 260 and 265 exit the second beam splitter component 245 and each combined beam has a different relative phase shift between the wave fronts of the signal beam component and the reference beam component within each combined beam pair. Combined beams 260 and 265 can also pass through pupil pushers 250 and 255. The pupil pushers are plane parallel windows or similar optical components that can be tipped and tilted to transversely align the combined beams 260 and 265 with combined beam 240 at the wave front sensor camera and whose optical thicknesses are set to adjust the conjugate plane imaging of combined beams 260 and 265 to match the same conjugate image plane location as combined beam 240. Combined beams 235, 240, 260 and 265 produce interference patterns 270, 272, 274 and 276 which can be processed with standard four-bin phase shifting interferometer phase reconstruction techniques to determine the amplitude of the signal beam 210 and the phase differences between the reference beam 205 and the signal beam 210. The interference patterns shown in FIG. 2A are merely representative examples.

Figure 2B:
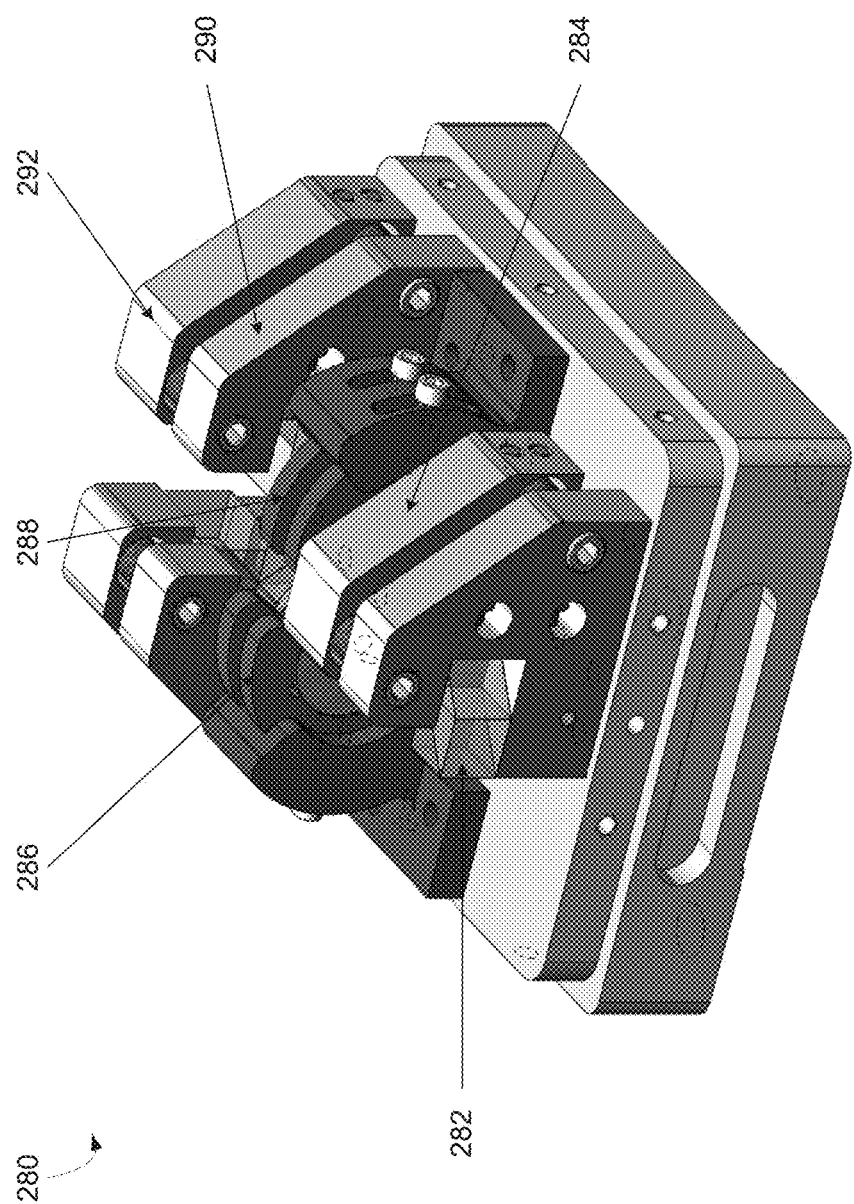

Referencing FIG. 2B, an isometric drawing of an exemplary miniature spatial phase shifter 280 is shown. Miniature spatial phase shifter 280 illustrates the compact form which the present invention can take. In contrast to the prior art spatial phase shifting assembly shown in FIGS. 1A and 1B, the miniature spatial phase shifter 280 shown in FIG. 2B has approximate dimensions of 2"×2"×1.5". Miniature spatial phase shifter 280 shows from a different view many of the components discussed in connection with exemplary FIG. 2A. An exemplary prism and beam splitter 282 receive a reference beam and signal beam, which are split and recombined into two beam pairs. The beam pairs pass through a pupil pusher 284 and wave plates 286 and 288. As explained in connection with FIG. 2A, one beam pair will pass through a half wave plate, a quarter wave plate, and the pupil pusher, whereas the other beam pair will pass through only a half wave plate. Next, the two beam pairs pass through a second set of beam splitters 290 producing four beam pairs, each pair with a different relative phase shift between its signal beam component and its reference beam component. Two of the beam pairs then pass through pupil pushers 292. The four beam pairs then exit miniature spatial phase shifter 280 and are detected by a wave front sensor camera (not shown).

Figure 3:
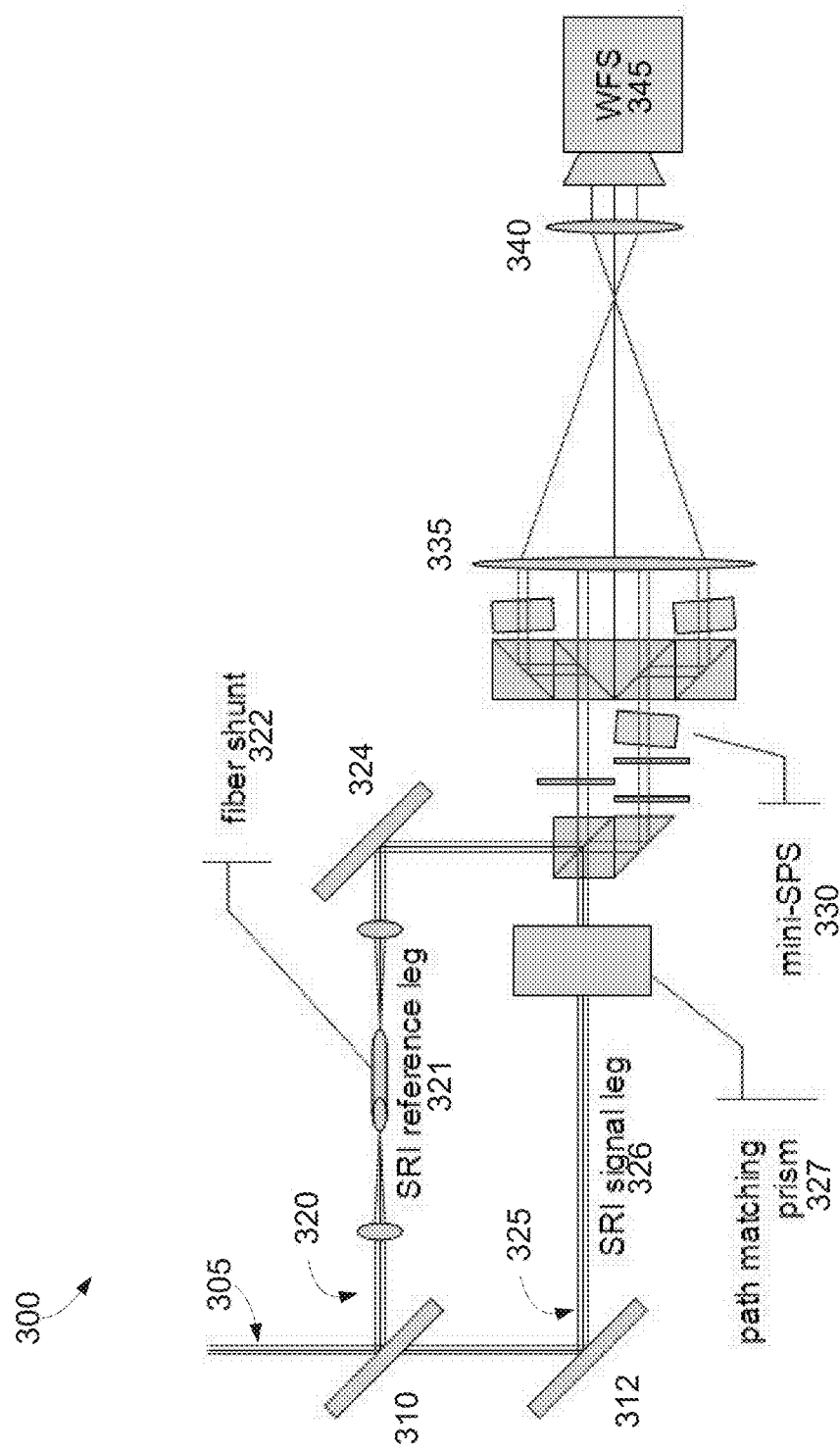
FIG. 3 illustrates a self-referencing interferometer with a spatial phase shifter in accordance with an exemplary embodiment of the invention.

Referring to FIG. 3, a self-referencing interferometer 300 is illustrated in accordance with an exemplary embodiment of the invention. In the self-referencing interferometer 300 illustrated in FIG. 3, an input beam 305 is received by interferometer 300 and the polarizing beam splitter 310 splits the input beam 305 into a reference beam 320 and a signal beam 325. Although not required, in the preferred embodiment, the input beam 305 is collimated. The signal beam 325 travels along signal path 326, reflecting off mirror 312 and passing through path matching prism 327 before reaching the miniature spatial phase shifting apparatus 330. The path matching prism 327 adjusts the signal beam path 326 so that signal beam 325 travels the same optical distance as the reference beam 320 after the two beams are split at beam splitter 310 until they are recombined at the miniature spatial phase shifter 330 to ensure coherence of the two beams at the wave front sensor ("WFS") camera 345. The path matching prism 327 also can be tipped and tilted to transversely align the signal beam at the wave front sensor camera. The signal beam alignment on the wave front sensor camera can be initially set and path matching prism 327 firmly locked down. Conversely, the tip and tilt of the path matching prism 327 can be adjusted dynamically, using feedback from the wave front sensor processing, to autonomously maintain alignment of the signal beam on the wave front sensor camera.

The reference beam 320 travels along reference leg 321, passing through fiber shunt 322 which has an aspheric lens on either end in the exemplary embodiment shown in FIG. 3. The aspheric lenses are conventional lenses used to couple the reference beam into the fiber shunt 322 and to recollimate the reference beam after it exits the fiber shunt 322.

The fiber shunt 322 is a single mode fiber that performs spatial filtering of the reference beam 320. The fiber shunt 322 attenuates aberrations in the reference beam 320 so that the interferometer can use the reference beam 320 for comparison against the signal beam 325. Before passing through the fiber shunt 322, the reference beam contains the same aberrations that are present in the signal beam. In the preferred embodiment, the fiber shunt 322 is a piece of single mode fiber approximately 10-20 mm in length that is polished at each end. The short length of the fiber shunt simplifies the hardware needed to match the path of the reference beam 320 and the signal beam 325. In contrast, the length of the reference fiber used with conventional spatial phase shifters, such as those illustrated in FIGS. 1A and 1B, is typically approximately 8 inches in length. Therefore, because the refractive index of glass is approximately 1.5, the 8 inches of reference fiber require approximately 12 inches of matching optical path and associated relay optical elements for the path on which the signal beam travels. Because the much shorter fiber shunt can sufficiently attenuate aberrations from the reference beam 320 for the interferometer 300, it greatly reduces the size and complexity of the interferometer.

In the preferred embodiment, the fiber shunt 322 is embedded in a ceramic ferrule, which provides a rigid, straight, low stress mechanical environment for the single mode fiber making it less sensitive to disturbances from vibrations so that the polarization state of the reference beam 320 is maintained. In alternate embodiments, other materials can be used in place of the ceramic ferrule including flexible fiber structures. However, flexible fiber structures are not as effective as the rigid ceramic ferrule. Furthermore, while not required for operation of the interferometer 300, the fiber shunt 322 provides another improvement. Those of skill in the art will appreciate that a pin hole filter could be used in place of the fiber shunt 322 to attenuate the aberrations in the reference beam. However, a pin hole generally does not work as well as the fiber shunt 322 at attenuating aberrations while also providing good optical throughput.

Several different approaches can be implemented for optically coupling the reference beam 320 into the fiber shunt 322. In one example, the fiber can be accurately positioned at the focus of the aspheric input lens. This position is where the fiber output should be placed relative to the output aspheric lens in order to produce a good collimated output beam. However, the input can be altered by defocusing the fiber tip to slightly spoil the coupling to help improve coupling efficiency when the aberrations on the input signal beam are large.

After the reference beam 320 exits the fiber shunt 322 and passes through the second aspherical lens, it is reflected by mirror 324 and enters the miniature spatial phase shifter 330. As described in greater detail in connection with FIG. 2, at the miniature spatial phase shifter 330, the reference beam 320 and the signal beam 325 are combined and split into four beam pairs, each of which comprises a component of the reference beam 320 and a component of the signal beam 325 and each of which has a different relative phase shift between the reference beam component and the signal beam component. The four combined beams that exit the miniature spatial phase shifter 330 each produce a different interference pattern due to the different relative phase shifts. The four beams exit the miniature spatial phase shifter 330 and pass through relay lenses 335 and 340 before being detected by wave front sensor camera 345. The wave front sensor processor, not shown in the figure, analyzes the interference patterns produced by the four beams and determines the aberration in the signal beam 325.

Those skilled in the art will recognize that certain modifications can be made to the exemplary interferometer 300 illustrated in FIG. 3 within the scope of the invention. For example, a variety of different lenses, mirrors and beam splitters can be used in connection with the conventional components illustrated in FIG. 3. Furthermore, the arrangement of the components in the miniature spatial phase shifter 330 can be modified. In another embodiment the components of miniature spatial phase shifter 330 can be arranged so that the four beams exit in a two by two formation instead of a one by four orientation. Additionally, beam splitter 310 can be polarizing or non-polarizing. If polarizing, the split ratio between the signal and reference beams can be adjusted with a half wave plate before the beam splitter. If non-polarizing, the split ratio can be adjusted with a variable intensity plate beam splitter. Half wave plates also may be used to adjust the polarizations of the signal and reference beams for input into the miniature spatial phase shifter. Optical relay lenses 335 and 340 are representative, indicating a relay producing proper magnification at the wave front sensor camera. This relay can be done in any number of ways, with more or fewer lenses.

Figure 4:
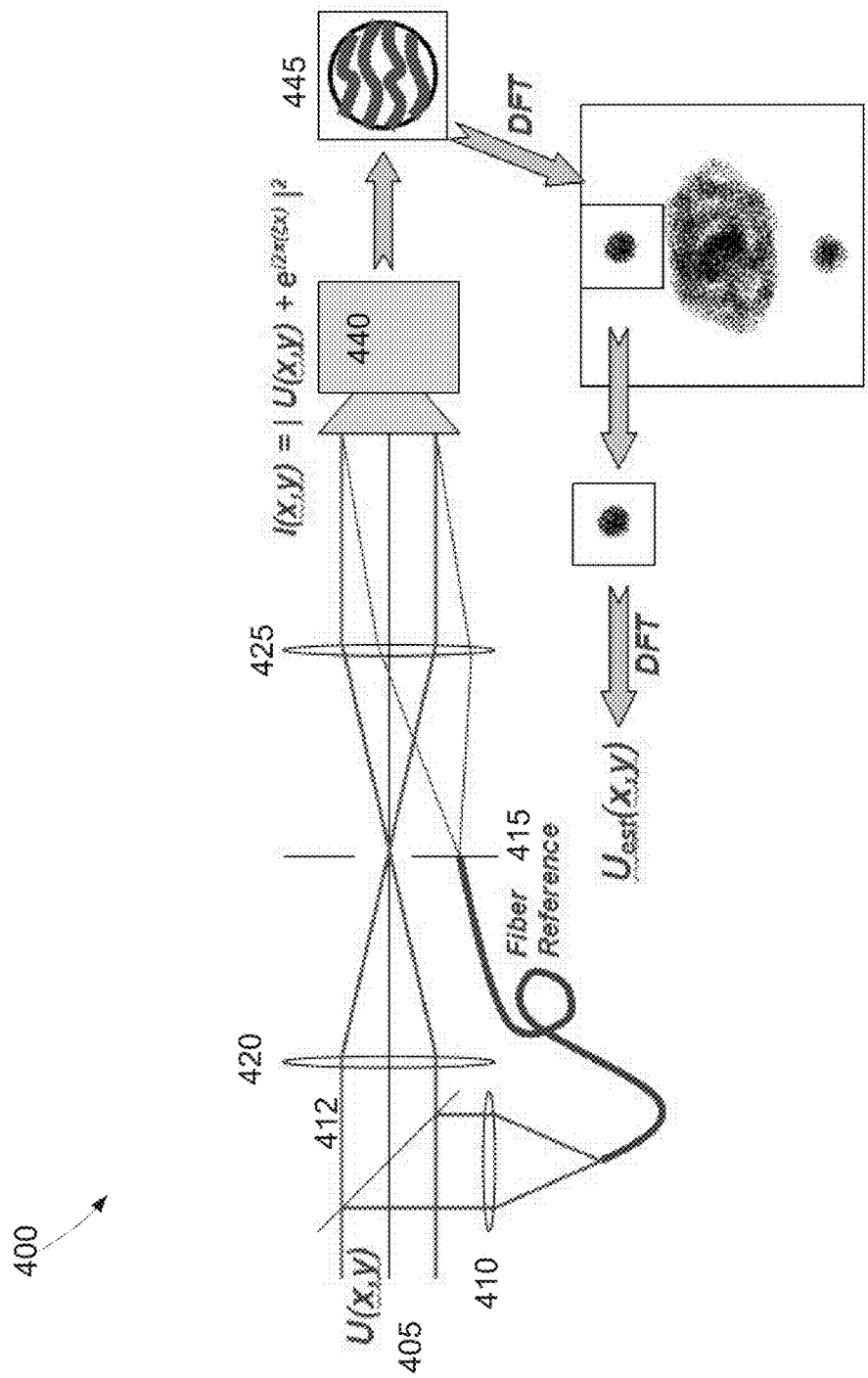
FIG. 4 illustrates a tilted self-referencing interferometer in accordance with an exemplary embodiment of the invention.

Turning to FIG. 4, another embodiment of an improved self-referencing interferometer is illustrated. FIG. 4 illustrates an exemplary tilted self-referencing interferometer 400. The interferometer 400 is distinct from the interferometer 300 illustrated in FIG. 3 in that interferometer 400 does not require that the input beam have a fixed or defined polarization. As illustrated in FIG. 2A, the reference beam and signal beam used in FIGS. 2A and 3 had fixed polarizations that were orthogonal. In contrast, interferometer 400 illustrated in FIG. 4 does not rely upon a fixed input polarization. FIG. 4 is a simplified illustration of the tilted self-referencing interferometer 400. More detailed illustrations of a tilted self-referencing interferometer are set forth in FIGS. 7 and 8.

The tilted self-referencing interferometer 400 illustrated in FIG. 4 operates by receiving an input beam 405 and splitting that input beam into reference beam 410 and signal beam 412. In the preferred embodiment, the input beam 405 is collimated. The reference beam 410 is filtered by the single mode reference fiber 415. The signal beam 412 passes through lens 420 and then is recombined with reference beam 410 at the focal plane of lens 420. The fiber reference output also is placed in the focal plane of lens 420 but is offset a defined amount from the signal beam focal spot. The combined signal beam 412 and reference beam 410 are re-collimated by lens 425 and the combined beam is detected at wave front sensor camera 440. By offsetting the reference fiber output relative to the signal beam focal spot location, the signal beam and reference beam will have a defined angle between them at the wave front sensor camera. The focal lengths and positions of lenses 420 and 425 are established so as to image the signal beam at a desired conjugate plane with a desired magnification.

The tilted self-referencing interferometer 400 is simpler than self-referencing interferometer 300 illustrated in FIG. 3 because instead of four interference images, only one interference image is needed at the wave front sensor 440. The spatial phase shifting of the combined signal beam 412 and reference beam 410 is performed in an interleaved fashion by combining the signal beam 412 and the reference beam 410 with a relative tilt between them. Because only a single combined image is needed and not four separate images as with interferometer 300, the architecture of the spatial phase shifter in interferometer 400 can be simpler. For example, the extra beam splitters, wave plates, and pupil pusher components needed in interferometer 300 to separate, align and properly image the four separate beams onto the wave front sensor camera are not necessary with the tilted self-referencing interferometer 400.

The following description explains different options for selecting the angle of the tilt between the signal beam 412 and the reference beam 410. To reconstruct the signal wave front at a resolution of N×N, the nominal tilt between the signal beam 412 and reference beam 410 should be set at $(3N/2)(\lambda/D)$, where $\lambda$ is the wavelength and D is the pupil diameter. This tilt will nominally produce 3N/2 fringes across the wave front sensor image. A tilt of 3N/2 will optimally separate the $0^{th}$ and $1^{st}$ spectral orders of the spatial frequency spectrum of the interference pattern (described below) without loss of the desired resolution information.

Figure 6:
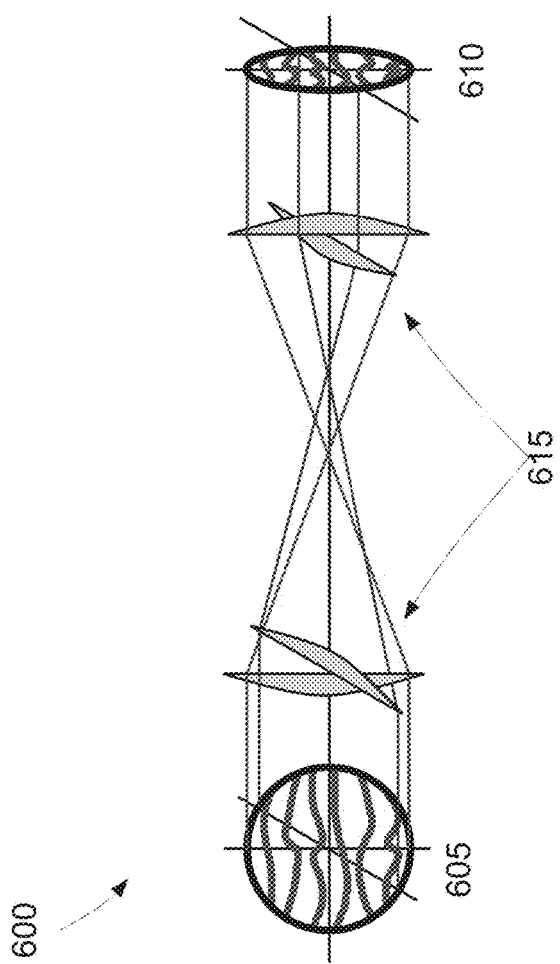
FIG. 6 illustrates asymmetric sampling of the image received at the wave front sensor in accordance with an exemplary embodiment of the invention.

Sampling requirements at the camera require 4 camera pixels per interference fringe, or 6N pixels across the pupil, although this level of sampling is only required in the direction of the relative tilt between the signal beam 412 and the reference beam 410. If optical squeezing is implemented, the sampling in the other direction is only 1 N. Thus, the anamorphic optical relay, which can be implemented as a crossed cylindrical lens relay as shown in FIG. 6 and discussed below, should provide a magnification ratio of 6:1 in the two directions.

In addition, a spatial filter, such as the 1-D spatial filter 707 shown in FIG. 7 and discussed below, should have a spatial frequency width of $N\lambda/D$ in the direction of the nominal tilt between the signal beam 412 and the reference beam 410. The width in the other direction should not be smaller than $N\lambda/D$, although it can be bigger. Spectral information outside the range $N\lambda/D$ is not useful because the corresponding spatial frequencies are too high to be reconstructed at the desired N×N resolution so blocking this information with a spatial filter will not degrade the performance of the wave front sensor. The 1-D spatial filter will then ensure that the $0^{th}$ and $1^{st}$ spectral order components calculated with the first discrete Fourier transform in the wave front reconstruction process described below do not overlap and are fully separated. The wave front sensor may still work without the 1-D spatial filter but the higher frequency information in the $0^{th}$ spectral order will corrupt the $1_{st}$ spectral order computation and thus degrade wave front sensor performance.

With the specified $(3N/2)(\lambda/D)$ tilt between the signal beam 412 and the reference beam 410, the $0^{th}$ order component of the spatial frequency spectrum will be centered at the origin of the spatial frequency domain with a width of $2N\lambda/D$ (i.e., twice the 1-D spatial filter width) and a frequency extent of $-N\lambda/D<F_x<N\lambda/D$, where $F_x$ denotes the spatial frequency axis corresponding to the direction of tilt between the signal beam 412 and the reference beam 410. The $1^{st}$ order component will be centered at $F_x=(3N/2)(\lambda/D)$ with a width of $N\lambda/D$ (i.e., the width of the 1-D spatial filter) and an extent of $N\lambda/D<F_x<2N\lambda/D$. With this configuration, the regions of the spatial frequency domain containing the $0^{th}$ and $1^{st}$ spectral orders will touch, but will not overlap.

In alternate embodiments, other tilt configurations between the signal beam 412 and the reference beam 410 can be used. For example, a tilt of $(M\lambda/D)$, where $M<(3N/2)$, will reduce the sampling requirement at the wave front sensor camera to $4M<6N$ pixels across the pupil so that fewer pixels must be read out from the wave front sensor camera and the camera can operate at a higher frame rate.

However, this configuration will produce an overlap of the desired spatial frequency information contained in the $0^{th}$ and $1^{st}$ spectral order components in the spatial frequency spectrum so that the N×N wave front reconstruction calculation is more easily corrupted. To compensate, the width of the 1-D spatial filter can be reduced to ensure the $0^{th}$ and $1^{st}$ spectral order components do not overlap but then the 1-D filter will block some of the desired spatial frequency information required to accurately reconstruct the signal wave front at a resolution of N×N. In this case, the reconstructed wave front effectively has a lower resolution than N×N since the spatial frequency content in the reconstruction is below the desired N×N resolution. In this configuration, the effective reconstruction resolution would be reduced by a factor of M/(3N/2).

On the other hand, a tilt of (MA/D) between the signal beam 412 and the reference beam 410, where M>(3N/2), will provide more separation of the 0th and 1st spectral order components in the spatial frequency spectrum so that there is less chance of corruption due to overlap of the spectral orders. However, this amount of tilt will also increase the sampling requirement at the wave front sensor camera to 4M>6N pixels across the pupil so that more camera pixels must be read out from the wave front sensor camera and the camera may run at slower frame rates. There will be more spatial frequency information available for use in the wave front reconstruction process so that the wave front reconstruction could have a higher resolution than N×N. However, if the desired reconstructed wave front resolution is only N×N, the extra information is not needed.

In summary, if a true, full-quality N×N reconstruction is desired, the optimal tilt between the signal beam 412 and the reference beam 410 should be nominally (3N/2)(λ/D) and the sampling at the wave front sensor camera should be 6N×N with optical squeezing implemented. Also the 1-D filter should have a width of (Nλ/D) in the direction associated with the tilt between the signal beam 412 and the reference beam 410.

Figure 5:
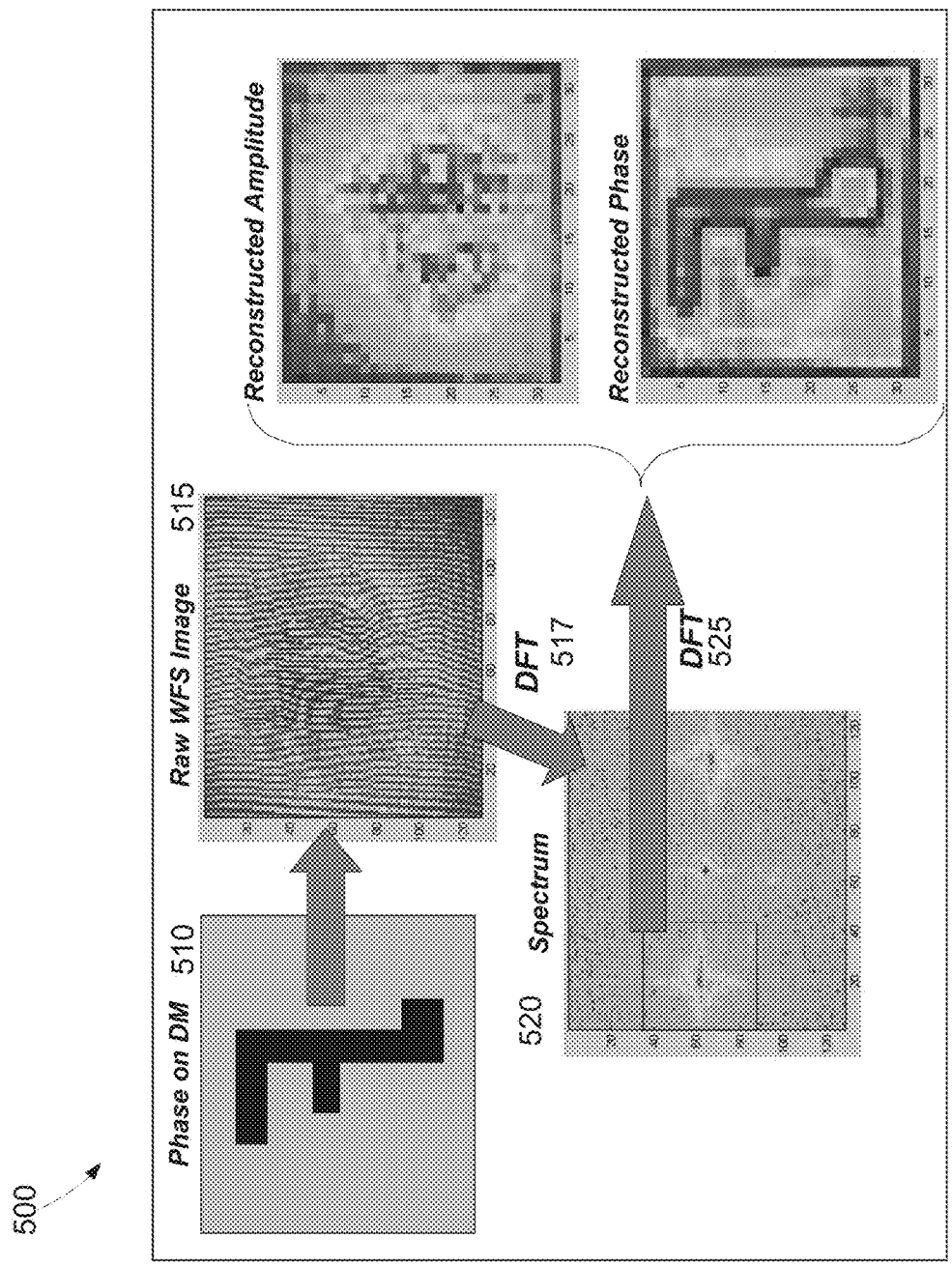
FIG. 5 illustrates a process for performing two discrete Fourier transforms on data received at a wave front sensor to determine wave front aberrations on the input signal beam in accordance with an exemplary embodiment of the invention.

A representation of the interference image produced by the combination of the reference beam 410 and the signal beam 412 is shown by image 445. The fringe pattern shown in image 445 will be modulated in the direction of the tilt between the reference beam 410 and the signal beam 412. A software module operating on a processor associated with the wave front sensor camera 440 can perform two discrete Fourier transforms ("DFT") to reconstruct the optical field of the signal beam 412 from the interference image detected at the wave front sensor camera 440. A laboratory example of the two discrete Fourier transforms processing is illustrated in FIG. 5 with the processing of interference image 515. Interference image 515 was produced by reflecting the input signal beam off of a deformable mirror ("DM") with phase aberration 510 placed on the deformable mirror. Note that the direction of tilt in FIG. 4 is in the vertical direction, so that the interference fringes run left-right, while the data shown in FIG. 5 has the tilt in the horizontal direction, so that the interference fringes run up-down. Also note that optical squeezing was not implemented for the data taken in FIG. 5. With the first discrete Fourier transform 517, the raw image 515 received at the wave front sensor camera 440 is transformed to reveal the spatial frequency spectrum 520 for the interference fringe pattern. The spatial frequency spectrum will contain a $0^{th}$ spectral order component, a $+1^{st}$ spectral order component, and a $-1$st spectral order component. The ±1st spectral order components are produced by the modulation in the interference fringes due to the tilt between the signal and reference beams. The $-1^{st}$ spectral order component is the complex conjugate of the $+1^{st}$ spectral order component. As depicted in the exemplary illustrations shown in FIGS. 4 and 5, the positive $1^{st}$ order component is cut out of the spectrum and operated on by a second discrete Fourier transform 525. With this second discrete Fourier transform 525, the amplitude and the phase of the interference image 515 are reconstructed.

As described above, if we assume the optimal tilt between the signal beam 412 and reference beam 410 is implemented, the interference image will be contained in a 6N×N pixel region of interest on the wave front sensor camera 440. The first discrete Fourier transform will produce a 6N×N estimate of the spatial frequency spectrum. If we divide this into N×N blocks (6 of them), the $0^{th}$ spectral order component will occupy the center two blocks and the $±1^{st}$ spectral order components will occupy the blocks to each side of the center two blocks (i.e., the $2^{nd}$ and $5^{th}$ N×N blocks). To cut out the $+1^{st}$ spectral order component, simply take the $2^{nd}$ N×N block. If the $5^{th}$ N×N block is used instead (i.e., the $-1^{st}$ spectral order component), the reconstructed optical field will be the complex conjugate of the field reconstructed with the $+1^{st}$ spectral order component. Therefore, either of the $1^{st}$ spectral order components can be used in the reconstruction process as long as the result is properly interpreted.

The reconstructed optical field will be an array of complex numbers, A +i B. The phase of the optical field can then be determined using the arctangent function, $θ=\arctan2(B, A)$, and the amplitude of the optical field can be determined using the square root function, $A =\sqrt{A^2+B^2}$. The phase calculated by the arctangent function will be in the range $-π>θ≥π$ and may contain $2π$ phase wrapping if the aberration extends beyond that range. The calculated phase can be used in this form with a direct phase control approach to control a deformable mirror, or some other spatial light modulator, and correct the aberrations in the signal beam. On the other hand. The calculated phase also can be unwrapped using standard techniques to produce an unwrapped phase estimates which is then used to control a deformable mirror. In order to speed up the wave front reconstruction processing, the first discrete Fourier transform calculation can be optimized to only calculate the desired $1^{st}$ spectral order component in the spatial frequency spectrum of the interference image. The entire spectrum in not required; only the portion needed for the second discrete Fourier transform calculation is needed. The rest of the spectrum is thrown away and so does not need to be calculated in the first place. By not calculating the unneeded portion of the spatial frequency spectrum, the processing can be performed faster with less processing latency.

In an alternative processing approach, the signal beam 412 can be reconstructed using a convolution process instead of performing two discrete Fourier transforms. This approach allows the processing to be parallelized to a greater extent so that it can execute faster than with the two discrete Fourier transform process. Convolution processes are well-known mathematical techniques as described, for example, in Gaskill's textbook "Linear Systems, Fourier Transforms, and Optics," the contents of which are incorporated herein in their entirety. The wave front reconstruction process using two discrete Fourier transforms described above can be exactly represented by a convolution, which can be viewed as a matrix-matrix multiply operation. The convolution process can also be viewed as an interpolation of the interference pattern, using a complex interpolation matrix (complex meaning A +i B). The ideal convolution matrix is generally infinite in extent but it can be approximated by a truncated, finite extent matrix with minimal loss in reconstruction accuracy.

The convolution process can be much faster than the discrete Fourier transform process because the discrete Fourier transform process requires access to the entire interference image before it can finalize the calculation of the spatial frequency spectrum. With the discrete Fourier transform process, the 1st spectral order cannot be fully calculated until all the pixels are read out from the wave front sensor camera and the first discrete Fourier transform is completed. Since the $1^{st}$ spectral order is needed before the second discrete Fourier transform calculation can begin, the second discrete Fourier transform calculation must wait. The two discrete Fourier transform process is sequential with certain later steps relying on previous steps being completed first. There is some pipelining that can be done with the discrete Fourier transform process, but then the process begins to look more like a convolution calculation.

In contrast, wave front reconstruction using a convolution process can be approximated quite well as a localized interpolation. For instance, to reconstruct the optical field at a given point in the wave front sensor image, the processing software can use the 11×1 pixels around the given point, or it can be based on pixel formats of 11×3, 23×1, or 23×3 as other examples. There are many choices for the size of the localized region. The point is that the calculation can be highly localized so the processing software only needs to wait for the required pixels to be read out from the wave front sensor camera before calculating the phase and amplitude at the desired point. With this approach to processing, the wave front reconstruction can occur in parallel with the readout of the wave front sensor camera and it can be completed very soon after the last pixel is read out from the camera. For example, using a 23×3 interpolation region, assume the wave front sensor camera readout is optimally oriented with respect to the fringe orientation. The processing software only needs to wait for the $23^{rd}$ pixel of the third camera row to be read out before reconstructing the field at the first point. Soon after the $3^{rd}$ camera row is read out, the processing software can be finished with reconstruction of the $1^{st}$ row of the reconstructed field. The processing software does not need to wait for the entire image. Once the 4th camera row is read, the processing software can be finished with the second row of the reconstruction. By the time the last pixel is read out from the wave front sensor camera, the reconstruction process will be almost complete with only the last few reconstruction points left to be calculated, a process that can be completed very quickly.

The discrete Fourier transform process and the convolution process described above are merely two examples of methods for reconstructing the signal beam. Those of skill in the art will recognize that there may be other methods for reconstructing the signal beam within the scope of the invention.

A modification to the tilted self-referencing interferometer 400 illustrated in FIG. 4 is shown in FIG. 6. As described above, the tilted self-referencing interferometer 400 requires oversampling of the interference image to reconstruct the signal beam 412 but the oversampling only needs to be in the direction of the nominal tilt between the signal beam 412 and the reference beam 410. Therefore, the software operating in conjunction with the wave front sensor camera 440 to reconstruct the signal beam 412 can perform asymmetric sampling along one axis as shown in FIG. 6 with images 605 and 610. The asymmetric sampling was described in greater detail above in connection with FIG. 4.

An examination of the reconstruction process shows that the sampling requirements of the interference image on the wave front sensor camera are not uniform. Finer sampling in the direction of the nominal tilt between the signal beam and the reference beam is needed in order to properly resolve the interference fringes but the sampling requirement in the orthogonal direction is not as high. Therefore, it is possible to demagnify, or squeeze, the image in this other direction to reduce the size of the camera readout and increase the frame rate of the wave front sensor camera. Analysis indicates squeezing causes a small reduction in WFS performance relative to using finer sampling in both directions (typically 1-2% degradation in the wave front sensor estimate Strehl). However, from an adaptive optics systems standpoint, the degradation from squeezing is easily traded for the resulting increase in adaptive optics closed-loop correction bandwidth, particularly for high-speed turbulence applications.

Squeezing of the WFS image can be accomplished optically with an anamorphic cylindrical lens relay as depicted in FIG. 6 or it can be accomplished with a combination of cylindrical lenses and anamorphic prisms. It is also possible to affect the reduced resolution by binning camera pixels in one dimension. However, in order to realize the speed improvement and minimize readout noise, the binning would have to be done in the focal plane array readout circuitry before A/D conversion (i.e., on-chip binning). Since on-chip binning is not a common feature of most cameras, we propose to implement optical squeezing of the wave front sensor image. As such, an anamorphic crossed cylindrical-lens relay 615 is included in the wave front sensor designs shown in FIGS. 7 and 8. In the adaptive optics system depicted in FIG. 8, the anamorphic relay is used to differentially magnify the two axes of the image of the deformable mirror surface and properly relay the image of the deformable mirror surface onto the wave front sensor camera 440 plane.

Figure 7:
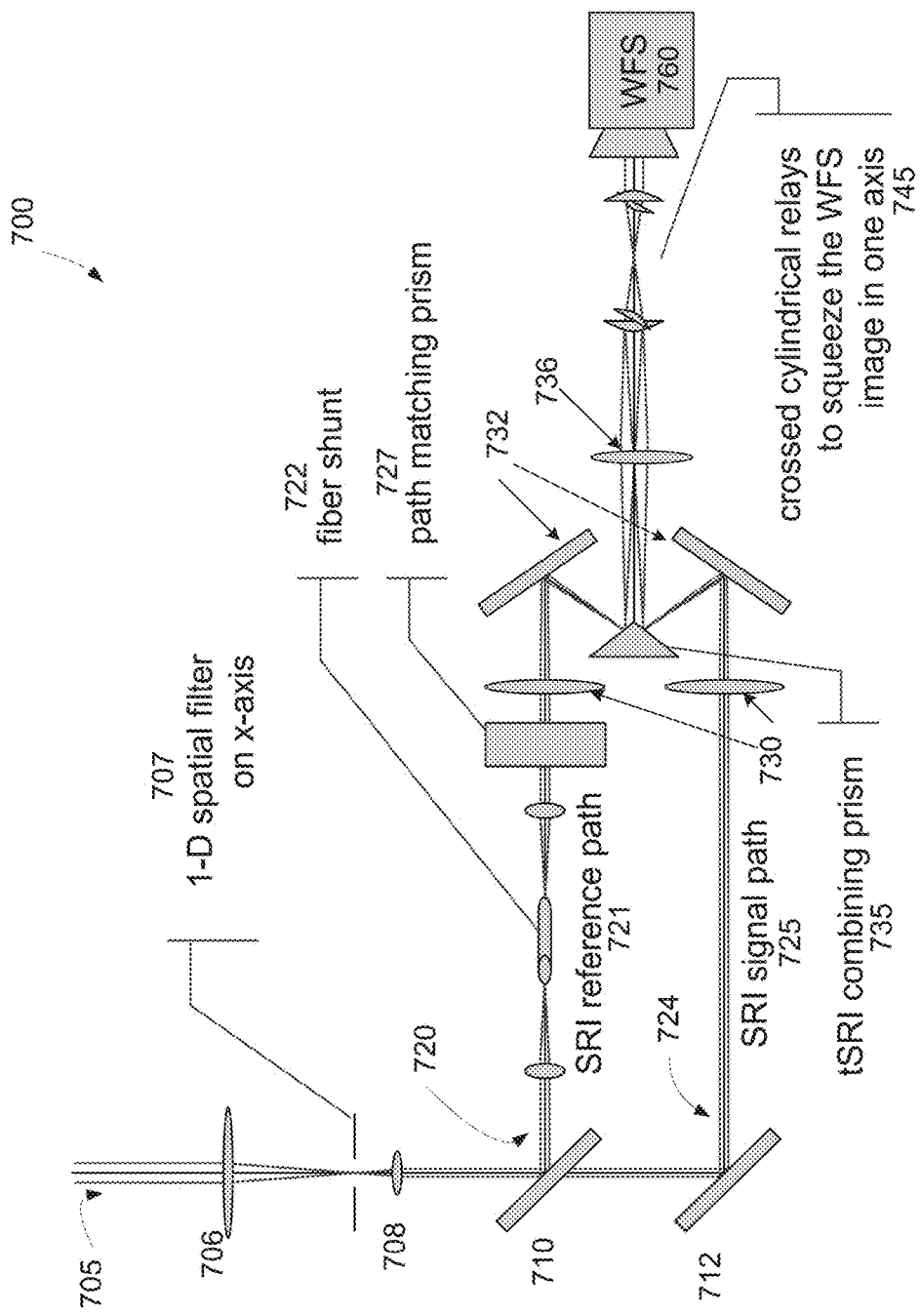
FIG. 7 illustrates a tilted self-referencing interferometer in accordance with an exemplary embodiment of the invention.

Referring to FIG. 7, an exemplary tilted self-referencing interferometer 700 is illustrated. The tilted self-referencing interferometer 700 combines the advantages of the fiber shunt, simplified spatial phase shifter, and optical squeezing to provide a simpler, smaller and lighter interferometer that can process an input beam regardless of its polarization. The exemplary tilted self-referencing interferometer 700 in FIG. 7 shows an input beam 705 passing through a pair of lenses 706 and 708 on either side of a 1-D spatial filter 707. As explained above in connection with FIG. 4 and as further described below in connection with FIG. 8, the 1-D spatial filter 707 ensures that the $0^{th}$ and $1^{st}$ spectral order components of the interference pattern do not overlap.

After exiting the lenses 706 and 708 and the 1-D spatial filter 707, the input beam 705 is split at beam splitter 710 into a reference beam 720 and a signal beam 724. The signal beam 724 is reflected by mirror 712 and is transmitted along signal path 725. The reference beam 720 is spatially filtered by fiber shunt 722 and transmitted along reference path 721. As illustrated in the embodiment in FIG. 7, conventional aspheric lenses are located at each end of the fiber shunt 722. After the reference beam passes through the fiber shunt 722, it will be a clean, spherical wave front that can be used for comparison against the signal beam 724 to determine the aberrations in the signal beam 724.

The reference beam 720 also passes through a path matching prism 727 so that the reference beam 720 and the signal beam 724 travel an equivalent optical path within interferometer 700. The path matching prism must be placed in either the signal path or the reference path, whichever has the shorter optical path length when the path matching prism is not included. The path matching prism 727 is used to increase the optical path length of the shorter path to match the other path. Positioning the path matching prism in one path or the other depends upon the configuration of the components in the interferometer. The path matching prism can also be tipped or tilted in order to align the associated beam on the wave front sensor camera 760. Those of skill in the art will recognize that the orientation of the reference path 721 and signal path 725 can be interchanged and that in other embodiments the orientation of other components shown in exemplary FIG. 7 can also be modified within the scope of the invention.

In one exemplary implementation, the reference beam 720 and the signal beam 724 are focused by a pair of lenses 730 and reflected by a pair of mirrors 732 onto combining prism 735. The combining prism 735 is located at or near the focal plane of lenses 730 and lenses 730 are positioned so their nominal focal planes occur at a common optical plane relative to lens 736. After reflection from the combining prism 735, the reference beam 720 and the signal beam 724 are recollimated by lens 736. The combining prism 735 and the lens 736 recombine the reference beam 720 and the signal beam 724 so that they produce an interference image at the wave front sensor camera 760. In alternate embodiments of the invention, different arrangements of prisms, lenses, and mirrors can be used to recombine the reference beam 720 and signal beam 724. Using lenses 730, mirrors 732, combining prism 735, and lens 736, the reference beam 720 and the signal beam 724 are recombined with a relative tilt between the two beams before they are recombined at the wave front sensor camera 760. The magnitude of the relative tilt can be controlled by adjusting the relative separation of the two focal spots on the combining prism 735. The relative separation can be controlled by linearly translating the combining prism to the left or right in the configuration shown in FIG. 7. Tilting the two beams relative to each other permits a simpler spatial phase shifting approach with the different phase shifts interleaved within the fringe pattern produced by the two beams as described above. Tilting of the two beams eliminates the need for creating four separate interference patterns produced by four combined beam pairs as illustrated and described in connection with FIG. 2.

The recombined beams are transmitted through anamorphic optical relay 745. The anamorphic optical relay 745 squeezes, or differentially magnifies, the two axes of the wave front sensor image as illustrated in FIG. 6. As illustrated in FIGS. 4 and 6, the image is squeezed along an axis that is parallel to the axis in which the reference beam and the signal beam lie before they are recombined. The squeezed image, such as image 610 in FIG. 6, permits the wave front sensor 760 to oversample the image along the long axis while minimizing the size of the camera readout in the other axis so the camera frame rate can be maximized.

Once the recombined beam exits the anamorphic relay 745, it is received at the wave front sensor camera 760. The wave front sensor includes a conventional computing device (not shown) with software configured to analyze the interference pattern produced by the recombined beams. The software can employ any one of a variety of mathematical techniques for analyzing the interference pattern including discrete Fourier transforms or a convolution process as described above. The processing software installed on the wave front sensor processor can identify aberrations in the signal beam 720 and send commands to a spatial light modulator to correct those aberrations.

Figure 8:
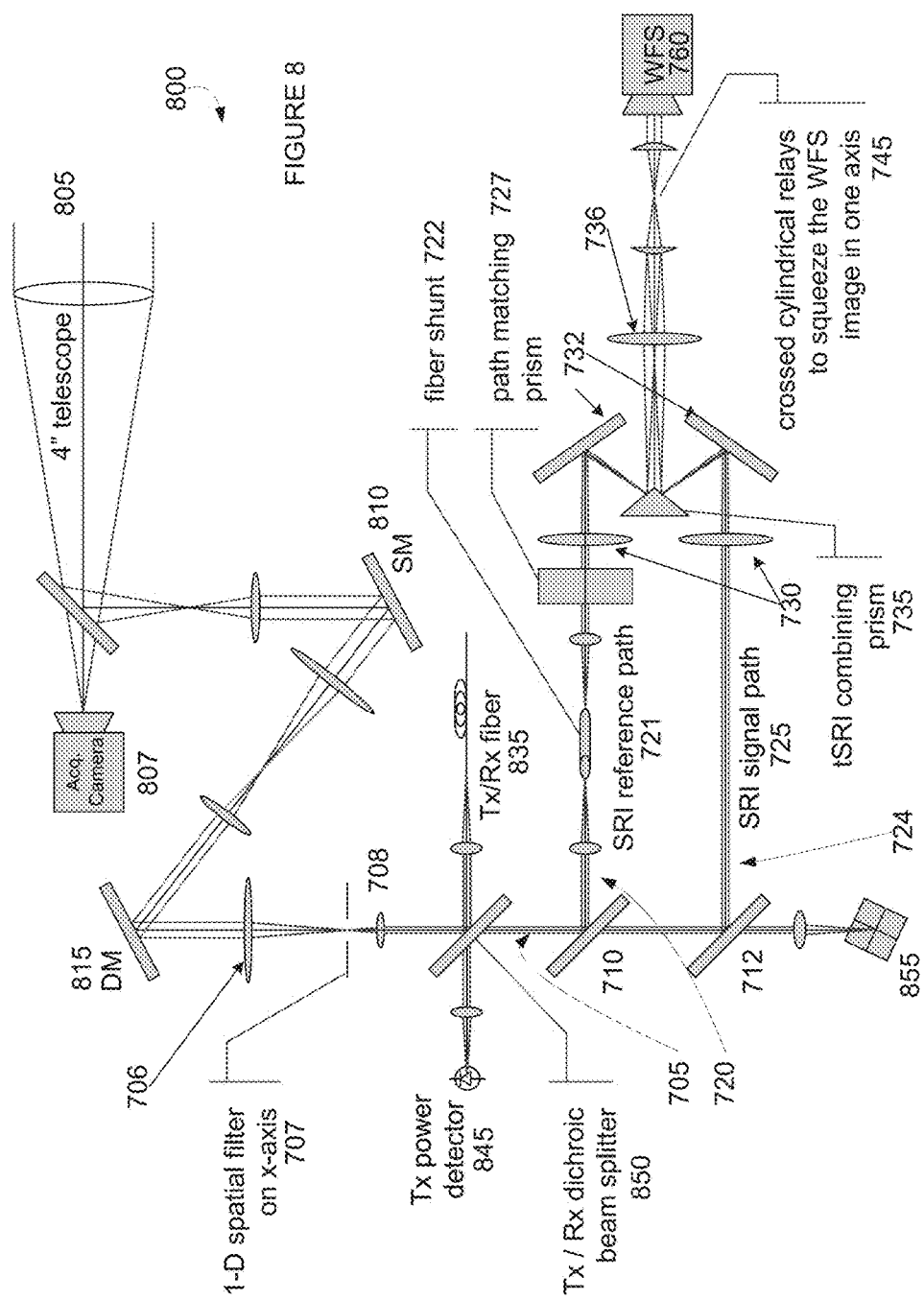
FIG. 8 illustrates a tilted self-referencing interferometer adaptive optics system in accordance with an exemplary embodiment of the invention.

Referring to FIG. 8, an exemplary laser communication system 800 is illustrated. Exemplary laser communication system 800 includes an adaptive optics system based on the exemplary interferometer 700 described and illustrated in FIG. 7. The reference numbers of the components in FIG. 7 correspond to the same reference numbers for the same components of the interferometer in FIG. 8.

In exemplary laser communication system 800, an output beam is transmitted from transmit/receive ("Tx/Rx") fiber 835. The output beam is reflected by dichroic beam splitter 850 and reflected off deformable mirror 815 and steering mirror ("SM") 810 before being transmitted out of the telescope 805 to the laser communications terminal on the opposite end of the communications link. The dichroic beam splitter 850 permits a small portion of the output beam to pass through for detection by the detector 845, which can be used to monitor the power of the output beam. The deformable mirror 815 can be used to modify the output beam to pre-compensate for expected aberrations in the beam as it is transmitted from the telescope 805 to the terminal at the other end of the communications link.

Concurrently an input beam is received at telescope 805. Acquisition camera 807 assists in orienting the telescope 805 so it is pointed at the terminal at the opposite end of the communications link and can transmit and receive laser communication beams to and from that terminal. The input beam is transmitted by the telescope 805 to the steering mirror 810. Steering mirror 810 is controlled by position sensing detector 855. The position of the steering mirror 810 can be adjusted to co-align the paths of the output beam and the input beam. As illustrated in exemplary embodiment 800, the input beam can be transmitted through one or more lenses and is reflected by deformable mirror 815. The surface of deformable mirror 815 can be adjusted to correct the aberrations in the input beam. As indicated above, adjusting the deformable mirror to correct the aberrations in the received input beam also pre-compensates the transmitted output beam. For example, the deformable mirror 815 can be controlled by the computing device (not shown) that operates with the wave front sensor camera 760. When the wave front sensor identifies aberrations in the input beam, the computing device can control the deformable mirror 815 to correct for the aberrations. Those of skill in the art will appreciate that the positions of the steering mirror 810 and the deformable mirror 815 are merely one example architecture. In other embodiments of the invention, the positions of the deformable mirror and the steering mirror may be altered or the two components could be combined into a single component. Furthermore, the deformable mirror 815 could be replaced with other spatial light modulating devices such as a liquid crystal device and the steering mirror could be replaced with other beam steering devices such as Risley prisms.

The corrected input beam is then transmitted through lens 706, 1-D spatial filter 707, and lens 708. As explained above, a discrete Fourier transform is used to calculate the spatial frequency spectrum of the wave front sensor image. The spectrum contains a $0^{th}$ order component and the two $1^{st}$ order components as shown in the example reconstruction in FIG. 5. The tilt between the signal and reference beams is set so that the $1^{st}$ order component is sufficiently separated from the $0^{th}$ order component. However, there are constraints on how much tilt should be used and, because of the finite receive aperture of the telescope 805, it is possible for the $0^{th}$ and $1^{st}$ order components to overlap and for part of the $0^{th}$ order to fall in the region that is cutout and used with the second discrete Fourier transform to reconstruct the residual wave front of the input beam. To mitigate this problem, the one-dimensional spatial filter 707 can be used on the input beam to ensure that the $0^{th}$ and $1^{st}$ order components in the Fourier spectrum do not overlap. The size of the filter depends on the desired tilt between the signal and reference beams within the wave front sensor which, in turn, depends on the number of actuators across the deformable mirror 815. The number of actuators determines the spatial frequencies in the aberrations of the input beam which can be corrected by the deformable mirror 815. Blocking out the higher spatial frequencies will not impact lasercom performance, since those frequencies will not couple into the receive fiber, but it will create a clean separation of the $0^{th}$ and $1^{st}$ order components in the spatial frequency spectrum and, thereby, improve wave front reconstruction accuracy. Those of skill in the art will recognize that the 1-D spatial filter 707 can be implemented in several different ways and at several places in the system 800.

After the input beam exits lens 708, it is transmitted to the dichroic beam splitter 850. The action of the dichroic beam splitter 850, how it transmits and reflects beams, depends on wavelength. As mentioned above, the beam splitter 850 reflects the majority of the output beam transmitted by the transmit/receive fiber 835 so that it can be directed out of the telescope 805. In contrast, due to the different wavelength of the input beam, a portion of the input beam is reflected to the transmit/receive fiber 835 and a portion of the input beam passes through the beam splitter 850 to the tilted self-referencing interferometer wave front sensor. The reflected portion of the input beam is transmitted along transmit/receive fiber 835 to communication equipment, not shown in FIG. 8, for decoding in accordance with the communication application.

The portion of the input beam that passes through the beam splitter 850 is the input beam 705 described in FIG. 7 and the text associated with FIG. 7. The interferometer can continuously analyze the input beam for aberrations and the wave front sensor processor can control the deformable mirror 815 as needed to correct the aberrations in the input beam. The deformable mirror 815 also modifies the output beam as described above to pre-compensate for aberrations the output beam is likely to encounter as it is transmitted to the laser communications terminal at the other end of the communications link.

The wave front sensor camera 760 includes or can be coupled to a computing device running software that includes a reconstruction algorithm for reconstructing the signal beam. As described above, the reconstruction can be implemented using a two discrete Fourier transform process or a simpler convolution process, both of which are analytic processes. With proper sampling of the image at the wave front sensor camera 760, all the correctable spatial frequency content in the wave front aberrations can be measured. Therefore, by applying the shifting property of the Fourier transform, the discrete Fourier transform or convolution coefficients can be adjusted to reconstruct the signal wave front accurately at different locations in the wave front sensor camera plane. As such, the reconstruction algorithm allows software correction of small levels of misregistration between the deformable mirror 815 and the plane of the wave front sensor camera 760. By modulating a small number of deformable mirror actuators a small amplitude at a frequency somewhat greater than the correction bandwidth of the adaptive optics system, the registration of the deformable mirror 815 to the wave front sensor camera 760 can be monitored. The modulation of the actuators would be large enough to be measurable but small enough so that it does not noticeably impact system performance. If a misregistration is determined, the reconstruction coefficients can be updated to correct it. Being able to correct for misregistrations in the processing software simplifies the adaptive optics system design, allows the optical fabrication and alignment tolerances to be relaxed, makes the system easier to design and fabricate, and improves ruggedness for operation in real-world environments.

It will be appreciated that the system 800 illustrated in FIG. 8 is merely exemplary and a similar system can be implemented in a variety of different ways with components in different positions and orientations. Furthermore, not all of the components illustrated in FIG. 8 or described above are required to be used with the self-referencing interferometer. For example, the 1-D spatial filter 707 and the path matching prism 727 may not be required depending on the application. Similarly, as an alternative to the anamorphic relay 745 using crossed cylindrical relays as shown in FIG. 8, the interferometer can use uniform sampling.

Those of skill in the art will recognize that laser communication system 800 is merely an example of one implementation of the invention described herein. For example, in other embodiments of a laser communication system, the improved interferometer described in connection with FIGS. 2 and 3 can be used instead of exemplary interferometer 700. Similarly, the arrangement of the components in the improved interferometers can be changed within the scope of the invention. For example, the various conventional components such as lenses and mirrors can be substituted for equivalent components or equivalent arrangements of components. As another example, the fiber shunt which improves the interferometer by reducing the size and complexity of the interferometer is not required in each embodiment of the improved interferometer described herein. Instead of the fiber shunt described above, a conventional single mode fiber or a plate with a pin hole filter can be used.

The embodiments set forth herein are intended to be exemplary. From the description of the exemplary embodiments, equivalents of the elements shown herein and ways of constructing other embodiments of the invention will be apparent to practitioners of the art. For example, the methods for processing a reference beam and a signal beam by one of the improved interferometers described herein may be modified but remain within the scope of the invention. Similarly, the arrangement of the components in the different exemplary improved interferometers described herein can be modified but remain within the scope of the invention. Moreover, the improvements to interferometers described herein can be used in other applications beyond laser communications such as directed energy applications or various types of optical testing and measuring. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention.

We claim:

1. A laser communication system comprising:
   a first optical system for receiving an output beam and transmitting the output beam to a first communications terminal over a communications link;
   a second optical system for receiving an input beam over the communications link and transmitting the input beam to a second communications terminal, wherein the first optical system and the second optical system share multiple optical components;

a third optical system for continuously monitoring a portion of the input beam received by the second optical system for aberrations and controlling a shared spatial light modulator of the first and second optical system to compensate for detected aberrations in the received input beam, wherein controlling of the shared spatial light modulator to compensate for the detected aberrations in the received input beam also pre-compensates for expected aberrations in the output beam, wherein the third optical system comprises includes, a beam splitter for receiving the portion of the input beam and splitting the portion of the input beam portion into a reference beam and a signal beam;

a single mode fiber for receiving the reference beam from the beam splitter and for spatially filtering the reference beam to reduce aberrations in the reference beam;

a combining prism system for recombining the reference beam, after being filtered by the single mode fiber, with the signal beam;

an anamorphic relay for modifying the recombined reference beam and signal beam;

a wave front sensor camera for receiving the modified recombined reference beam and signal beam from the anamorphic relay, a computing device coupled to the wave front sensor camera, the computing device adapted to identify aberrations in the signal beam and control the shared spatial light modulator to compensate for detected aberrations in the received input beam, wherein controlling of the shared spatial light modulator to compensate for the detected aberrations in the received input beam also pre-compensates for expected aberrations in the output beam.

2. The laser communication system of claim 1, wherein the combining prism system includes multiple optical components for introducing a relative tilt between the reference beam and the signal beam prior to recombination, wherein a magnitude of the relative tilt is controlled by adjusting a relative separation of the focal spots of the reference and signal beams on a combining prism of the combining prism system by linearly translating the combining prism in a direction towards or away from the wave front sensor camera.

3. The laser communication system of claim 1, wherein the third optical system further comprises a path matching prism for receiving the filtered reference beam from the single mode fiber.

4. The laser communication system of claim 1, wherein the computing device performs two discrete Fourier transformation processes on the recombined reference beam and signal beam to identify the aberrations in the signal beam.

5. The laser communication system of claim 1, wherein the computing device performs a convolution process on the recombined reference beam and signal beam to identify the aberrations in the signal beam.

6. The laser communication system of claim 1, wherein the single mode fiber for filtering the reference beam is a single mode fiber shunt.

7. The laser communication system of claim 1, wherein the combining prism receives the reference beam and the signal beam such that there is an angle between the reference beam and the signal beam, the angle being greater than 0 degrees and less than 180 degrees.

8. The laser communication system of claim 1, wherein the wave front sensor asymmetrically samples an interference pattern formed by the recombined reference beam and signal beam such that the wave front sensor samples more data from the recombined reference beam and signal beam along an axis that is parallel to the axis in which the reference beam and the signal beam both lie before they are recombined.

9. The laser communication system of claim 1, wherein the shared spatial light modulating device is a deformable mirror.

* * * * *